A. LECKEY & G. W. DAYMON.
VEHICLE DIRECTION INDICATOR AND SIGNAL.
APPLICATION FILED MAR. 7, 1917.
1,296,094.
Patented Mar. 4, 1919.
2 SHEETS—SHEET 1.
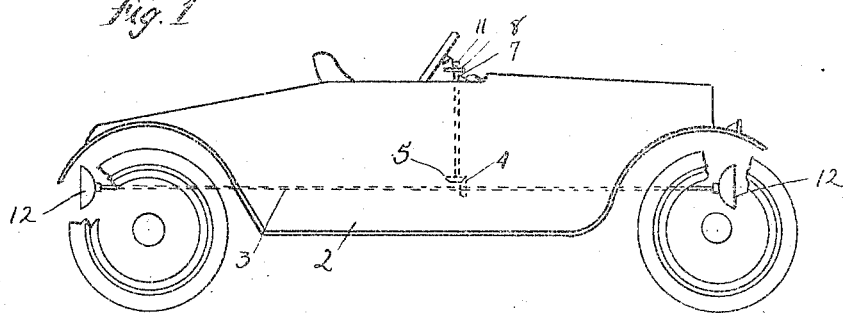
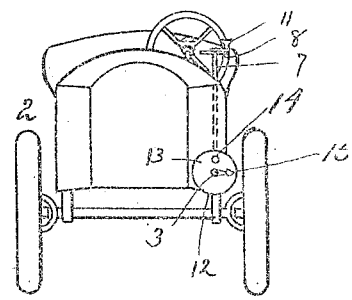
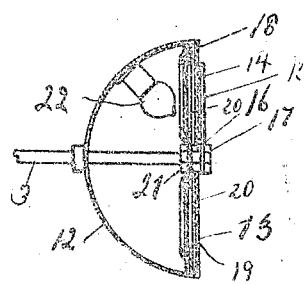
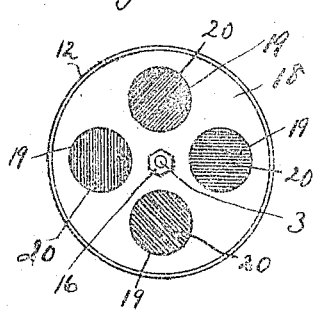
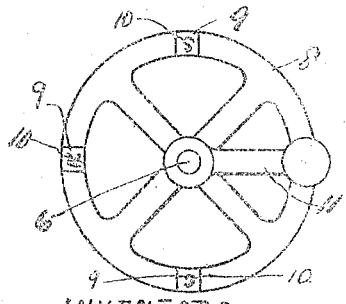
INVENTORS
Alexander Leckey
George W. Daymon
W. W. Williamson

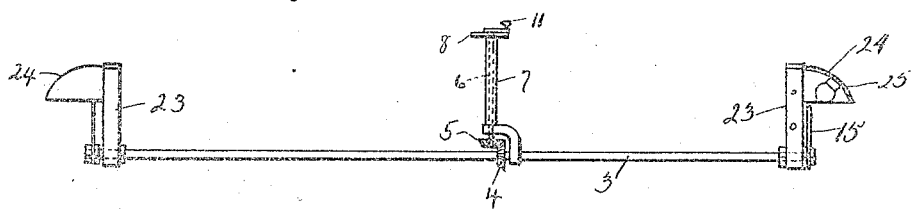
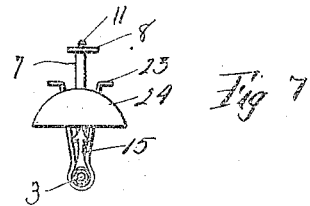
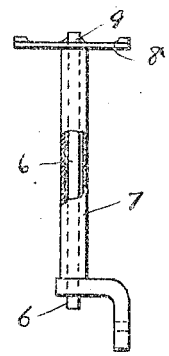

UNITED STATES PATENT OFFICE.

ALEXANDER LECKEY, OF CAMDEN, NEW JERSEY, AND GEORGE W. DAYMON, OF PHILADELPHIA, PENNSYLVANIA.

VEHICLE DIRECTION-INDICATOR AND SIGNAL.

1,296,094.  Specification of Letters Patent.  Patented Mar. 4, 1919.

Application filed March 7, 1917. Serial No. 153,147.

*To all whom it may concern:*

Be it known that we, ALEXANDER LECKEY and GEORGE WASHINGTON DAYMON, citizens of the United States, and residents, respectively, of Camden, in the county of Camden and State of New Jersey, and Philadelphia, county of Philadelphia, and State of Pennsylvania, have invented new and useful Improvements in Vehicle Direction-Indicators and Signals, of which the following is a specification.

Our invention relates to new and useful improvements in vehicle direction indicator and signal, and has for its object to provide an exceedingly simple and effective device of this character whereby the course of the vehicle may be indicated to approaching or following traffic, or the intention of the operator to proceed or stop signaled to other traffic upon the roadway.

A further object of the invention is to provide an indicator and signal which may be readily operated by the chauffeur or driver of the vehicle, and which may be persons riding or walking and which may be readily seen either in the day-time or during darkness.

A still further object of the invention is to provide a device of this character which will be relatively inexpensive in the cost of manufacture, exceedingly compact, because of having few parts, but which will be strong and durable.

With these ends in view, our invention consists in the details of construction and combination of elements hereinafter set forth and then specifically designated by the claims.

In order that those skilled in the art to which this invention appertains, may understand how to make and use the same, we will describe its construction in detail, referring by numerals to the accompanying drawings forming a part of this application, in which—

Figure 1, is a side elevation of a vehicle, showing our improvement applied thereto.

Fig. 2, is a front elevation thereof.

Fig. 3, is an enlarged, vertical sectional view of one of the casings.

Fig. 4, is a front elevation thereof with the front plate removed.

Fig. 5, is an enlarged plan view of the indicating member or the operating handle.
Fig. 6, is a side elevation, partly in section of a slightly modified form of my invention, the same being removed from the vehicle.

Fig. 7, is a front elevation thereof; and

Fig. 8, is an enlarged side elevation, partly in section, of the barrel inclosing the operating shaft, and showing its relation to other adjacent elements.

In carrying out our invention as here embodied, 2 represents a vehicle, here illustrated as an automobile, and to this vehicle is attached in any suitable position a longitudinal horizontal shaft 3 carrying a beveled gear 4, which meshes with another beveled gear 5 secured to one end of the operating shaft 6, the other end of which is located within easy access of the operator. Said shaft is rotatably mounted in a barrel 7 rigidly secured to some suitable portion of the vehicle, the outer end of which carries an indicating member 8 which may be of any suitable shape or size, here shown as round, and having indentations 9 therein, said indentations being provided with indicating marks 10, such as the letter R for right, S for stop, L for left and C for clear. While in the foregoing we have referred to rigid shafts for transmitting the desired motion we contemplate as well other means of transmitting motion from the vicinity of the driver's seat to the signal apparatus which may comprise a flexible shaft of well known construction which may be readily inserted in place at the under portion of the vehicle. There are other methods of transmitting motion which we have contemplated but which need only a mere reference thereto.

The outer end of the operating shaft 6 projects beyond the outer end of the barrel 7, and on said projecting end is mounted an operating crank or handle 11, of a size suitable to fit the indentations 9, so that when the proper adjustment is obtained, the crank handle is held against accidental movement.

The longitudinal shaft 3 runs the entire length of the vehicle and projects into a suitable casing 12 of any desirable size or shape, and any suitable construction, one of which is secured to the vehicle at the front and rear. Each of these casings is provided with a face plate 13 having a sight opening 14 therein, and the ends of the shaft 3 project through the casings and their plates, which act as bearings for the ends of said shaft, while on the ends of said shaft, outside of the face plates are secured pointers

15 which are arranged to rotate with the shaft 3, and in practice these pointers are held between two nuts 16 and 17, threaded upon the ends of the shaft.

Within each casing and on the shaft 3 is mounted a spectacle disk 18 having a number of openings 19 of any desirable shape, therein, across each of which is disposed a sheet of transparent material 20, such as glass, and each may be differently colored, or one may be clear and the other three differently colored, whereby indications and signals of different meaning may be given. This spectacle disk is preferably held upon the shaft between the nut 16 and another nut 21 threaded upon the shaft. In each casing 12 is also located a suitable source of light 22 such as an electric light bulb, and this is so situated or arranged that the rays of light therefrom will pass out of the sight opening 14 and through any one of the differently colored members 20.

In practice when it is desired to indicate to approaching or following traffic that the operator of the vehicle intends to proceed along the road-way, the operating or crank handle 11 is turned to the proper position, for instance, the indication mark C on the indicating member 8, which will move both the front and rear pointers 15 into an upwardly projecting position across the sight opening 14, and at the same time the member 20 which indicates "clear" will be disposed across the sight opening 14, so that during darkness when the source of light 22 is being used, two separate and distinct indications are produced, while during the daytime, or when the streets are exceedingly well lighted, the source of light 22 may be dispensed with, and all the signals or indications produced by means of the pointers.

When the operator of the vehicle is going to stop, the operating or crank handle 11 is turned to the proper position, which will turn the pointers 15 downward and move the red or other suitably colored transparent member 20 into alinement with the sight opening 14. Likewise when the operator of the vehicle is going to turn, either right or left, the operating or crank handle 11 is turned to the proper position to move the pointer 15 either to the right or left, as the case may be, and at the same time move one of the transparent members 20 into alinement with the sight opening 14 and these transparent members will be of different colors, as for instance, green when turned to the right, and blue when turning to the left.

As will be noted from the above description, the intentions of the operator to move forward, stop or proceed, either to the right or left may be easily and quickly indicated, both at the front and rear of the vehicle, so that traffic proceeding in either direction will be at once apprised of the direction to be taken by the vehicle, provided with such signals, therefore reducing to a minimum the likelihood of accidents, and loss of life or property.

In Figs. 6 and 7, we have shown a slightly modified form of our invention, in which the casings 12 and the differently colored signal spectacles or members 20 are dispensed with, and in place of the casings, suitable brackets 23 are secured at the front and rear of the vehicle, in which are journaled the ends of the longitudinal shaft 3 with their ends projecting beyond said brackets, while on said projecting ends are secured the pointers 15, in the same manner as above described.

In some suitable position, as for instance, above the pointers 15 are secured the shields 24, one at each end of the vehicle, and within these shields is arranged a suitable source of light 25, such as electric light bulbs, so that the rays of light therefrom will be projected upon the outer face of the pointers. During the daytime, these pointers may be readily seen by the natural light, and during darkness the rays of light thrown from the source of light 25 will be projected upon said pointers, so that the same may be readily seen, and said pointers should be of such color or material as to reflect and intensify the rays of light.

The operation of this form of our invention is identical with the form shown in Figs. 1 and 2, with the exception that no colored indications are produced.

Of course we do not wish to be limited to the exact details of construction as herein shown, as these may be varied within the limits of the appended claims without departing from the spirit of our invention.

Having thus fully described our invention, what we claim as new and useful, is—

1. In a vehicle direction indicator and signal in combination, a casing, a face plate provided with a sight opening, a shaft having one end projecting through the casing and face plate, a spectacle disk having openings therein mounted upon said shaft within the casing, transparent members of different colors disposed across said openings, a source of light within the casing, a pointer secured to the end of the shaft outside of the face plate, said pointer and said spectacle disk being rigidly connected and means for revolving said shaft to change the position of the pointer and simultaneously moving one of the transparent members of the spectacle disk to the sight opening.

2. In a device of the character stated in combination, a casing and face plate provided with a sight opening carried by said casing, a rotatable shaft journaled in said casing and face plate, a pointer secured to one end of the shaft and adapted to be rotated in front of said face plate, a spectacle disk having a number of openings therein secured to the shaft within the casing whereby said openings may be moved to the sight opening in the face plate, said pointer and said spectacle disk being rigidly joined and moving together, transparent members of different colors disposed across the openings in the spectacle disk and a source of light within the casing disposed so as to project rays of light therefrom through the sight opening in the face plate.

In testimony whereof, we have hereunto affixed our signatures.

ALEXANDER LECKEY.
GEORGE W. DAYMON.